(12) United States Patent
Haas et al.

(10) Patent No.: US 6,993,516 B2
(45) Date of Patent: Jan. 31, 2006

(54) EFFICIENT SAMPLING OF A RELATIONAL DATABASE

(75) Inventors: Peter Jay Haas, San Jose, CA (US); Guy Maring Lohman, San Jose, CA (US); Mir Hamid Pirahesh, San Jose, CA (US); David Everett Simmen, San Jose, CA (US); Ashutosh Vir Vikram Singh, San Jose, CA (US); Michael Jeffrey Winer, Markham (CA); Markos Zaharioudakis, Paris (FR)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 10/329,892

(22) Filed: Dec. 26, 2002

(65) Prior Publication Data

US 2004/0128290 A1 Jul. 1, 2004

(51) Int. Cl.
*G06F 17/30* (2006.01)

(52) U.S. Cl. .............................. 707/2; 707/6
(58) Field of Classification Search .................. 707/2, 707/6
See application file for complete search history.

(56) References Cited

U.S. PATENT DOCUMENTS

| | | | |
|---|---|---|---|
| 5,675,786 A | | 10/1997 | McKee et al. |
| 5,878,426 A | | 3/1999 | Plasek et al. |
| 5,890,150 A | | 3/1999 | Ushijima et al. |
| 5,950,189 A | | 9/1999 | Cohen et al. |
| 5,978,788 A | | 11/1999 | Castelli et al. |
| 6,067,542 A | * | 5/2000 | Carino, Jr. .................... 707/4 |
| 6,182,061 B1 | | 1/2001 | Matsuzawa et al. |
| 6,223,171 B1 | * | 4/2001 | Chaudhuri et al. ............ 707/2 |
| 6,278,989 B1 | * | 8/2001 | Chaudhuri et al. ............ 707/2 |
| 6,301,575 B1 | * | 10/2001 | Chadha et al. ................. 707/2 |
| 6,363,371 B1 | | 3/2002 | Chaudhuri et al. |
| 6,374,251 B1 | | 4/2002 | Fayyad et al. |
| 6,493,637 B1 | * | 12/2002 | Steeg ........................ 702/19 |
| 6,532,458 B1 | * | 3/2003 | Chaudhuri et al. ............ 707/2 |
| 2001/0000536 A1 | | 4/2001 | Tarin |
| 2002/0077968 A1 | | 6/2002 | Kaniwa et al. |
| 2002/0087518 A1 | | 7/2002 | Ellis et al. |
| 2002/0198863 A1 | * | 12/2002 | Anjur et al. .................... 707/1 |

OTHER PUBLICATIONS

Chaudhuri et al, Random sampling for histogram construction: how much is enough? (ABSTRACT), 1998 ACM SIGMOD Int'l Conference on Management of Data, Seattle, WA, USA, Jun. 1-4, 1998, vol. 27, No. 2, p. 436-447.*

Chang, Lee and Chang, Sue-An, "Utilizing Page-Level Join Index for Optimization in Parallel Join Execution," IEEE Transactions on Knowledge and Data Engineering, vol. 7, No. 6, Dec. 1995.

* cited by examiner

*Primary Examiner*—Wayne Amsbury
(74) *Attorney, Agent, or Firm*—Jose Gutman; Fleit, Kain, Gibbons, Gutman, Bongini & Bianco P.L.

(57) ABSTRACT

A system, method and computer readable medium for sampling data from a relational database are disclosed, where an information processing system chooses rows from a table in a relational database for sampling, wherein data values are arranged into rows, rows are arranged into pages, and pages are arranged into tables. Pages are chosen for sampling according to a probability P and rows in a selected page are chosen for sampling according to a probability R, so that the overall probability of choosing a row for sampling is Q=PR. The probabilities P and R are based on the desired precision of estimates computed from a sample, as well as processing speed. The probabilities P and R are further based on either catalog statistics of the relational database or a pilot sample of rows from the relational database.

21 Claims, 6 Drawing Sheets

EFFICIENT SAMPLING OF A RELATIONAL DATABASE

BACKGROUND OF THE INVENTION

1. Field of the Invention

This invention generally relates to the field of data sampling and more specifically to data sampling of relational databases using Bernoulli sampling.

2. Description of Related Art

The vast amount of data in modern warehouses and on the web poses a major challenge for analytical, mining, and statistical applications. Many data analysis algorithms simply do not scale to the hundreds of terabytes of data often found in modern repositories. At the same time, users are demanding that decision support systems be increasingly fast, flexible, and responsive. This pressure by users arises both from the ever-increasing pace of e-business and from the development of applications that support real-time interaction with data, such as spreadsheets and On-Line Analytical Processing (OLAP) tools. Although increases in CPU and disk speeds are helpful in dealing with massive data, hardware improvements alone do not suffice. Indeed, there is evidence that computer systems are getting slower in that the volume of online data is growing at a rate faster than Moore's law.

In light of this situation, it has become increasingly apparent that sampling techniques are a crucial component of a modern database management system (DBMS). These techniques permit the computation of approximate query results—which often suffice in practice—in a fraction of the time required to compute an exact answer.

Recognizing the importance of sampling, the International Organization for Standardization (ISO) has been developing a standard for extending the Structured Query Language (SQL) query language to handle sampling in user queries. Under the proposed ISO sampling standard, each table reference in an SQL query may be followed by a sampling clause.

The current sampling methods supported by the standard are "row-level Bernoulli sampling" and a vendor-defined sampling method. For row-level Bernoulli sampling with sampling rate $Q \in (0, 1]$, each row is included in the sample with probability $Q$ and excluded with probability $1-Q$, independently of the other rows. In current commercial systems, the vendor-defined sampling method is typically implemented as a page-level Bernoulli sampling scheme. That is, for each page, all of the rows on the page are included in the sample with probability $Q$ and all of the rows are excluded with probability $1-Q$, independently of the other pages. Bernoulli schemes are particularly well suited to database sampling because (1) Bernoulli sampling is easy to parallelize and (2) in the case of row-level sampling, the sampling operator can be treated essentially as just another predicate by the query optimizer and hence can be costed, pushed down to the lower levels of the query execution tree, and so forth.

This new database sampling functionality, while potentially quite effective for dealing with massive datasets, is not always easy to exploit. In particular, choosing the appropriate sampling method for a particular query-processing task can be decidedly nontrivial. Row-level sampling yields precise results but is often very expensive to execute, whereas page-level sampling is much faster, but yields results that are much less precise. Current commercial DBMS products do not provide guidance on which sampling method to choose for a specified problem. If the user chooses row-level Bernoulli sampling, then chances are that the query will take too long to complete. If, on the other hand, the user chooses page-level Bernoulli sampling, then the query will execute quickly but the result may well be too imprecise to be useful—in this case, the user will need to re-execute the query using a higher sampling rate, in a painful process of trial and error. Therefore a need exists to overcome the problems with the prior art as discussed above, and particularly for a way to automatically and more efficiently sample data from large relational databases.

SUMMARY OF THE INVENTION

A preferred embodiment of the present invention comprises a bi-level sampling method that avoids the foregoing problems by permitting a systematic tradeoff between speed and precision. Moreover, a preferred embodiment of the invention enables a database system to automatically select optimal or near-optimal values for the parameters that govern the sampling method's behavior.

According to a preferred embodiment of the present invention, a bi-level Bernoulli sampling method provides quick approximate answers to a large class of SQL aggregation queries, including, but not limited to, aggregation queries of the form QUERY 1:
SELECT <agg>(col)
FROM t
WHERE <predicate> where <agg> is one of SUM, AVERAGE, or COUNT, col is a column of a table t and <predicate> is a logical predicate on the attributes of table t (each row in table t either satisfies the predicate or fails to satisfy the predicate). By adjusting the parameters of the method, the user can trade off processing speed and statistical precision. Expressions for optimal parameter settings (probabilities P and R—see below) in the context of sampling problems with explicit time or precision constraints are also disclosed. These expressions involve constants that are estimated by means of a pilot sample. Finally, we give a heuristic method for setting the sampling parameters. This latter method avoids the need for a pilot sample and requires only that the database system store a small number of summary statistics in the system catalog (catalog statistics) that are easy to maintain.

Briefly, in accordance with the present invention, disclosed is a system, method and computer readable medium for sampling data from a relational database. In a preferred embodiment of the present invention, the method on an information processing system includes choosing rows from a relational database table for sampling, wherein rows are arranged into pages, and pages are arranged into tables. Pages are chosen for sampling according to a probability P, rows from each selected page are chosen for sampling according to a probability R, so that the overall probability of choosing a given row for sampling is Q=PR. Note that there are infinitely many ways to choose P and R so as to achieve an overall row selection probability of Q. The specific choice of the probabilities P and R is based on desired data sampling precision and processing speed. The probabilities P and R are further based on either catalog statistics of the relational database or a pilot sample of data values from the relational database.

In one preferred embodiment of the present invention, in which the user wishes to estimate the answer to Query 1 and selects an overall sampling probability Q, probabilities P and R are based on catalog statistics of the relational database and are defined by the following formulas:

$$R = \max(R_0, Q) \text{ and } P = Q/R$$

$$R_0 = 1 - (1 - f(v,d))^{d/m},$$

$$f(v, d) = 1 + \left(\frac{1}{1+v}\right)\left(\frac{1}{d} - 1\right),$$

where for each value of d, f(v,d) is a function that is non-decreasing in v and takes on values ranging from 1/d to 1, for example, $$f(v, d) = 1 + \left(\frac{1}{1+v}\right)\left(\frac{1}{d} - 1\right),$$

and where
d is the average number of distinct column values per page,
m is the average number of rows per page,
v=average($v_1$, ..., $v_n$)/variance($a_1$, ..., $a_n$),
n is the number of pages in the relational database,
$v_k$ is the variance of the column values on the kth page, and
$a_k$ is the average of the column values on the kth page.

In another preferred embodiment of the present invention, in which the user wishes to estimate the answer to Query 1 and selects an overall row sampling probability Q, the method further comprises a step before the choosing step of calculating a pilot sample of the rows in table t such that pages are chosen for sampling according to a probability P' and rows from each selected page are chosen for sampling according to a probability R'. Further, the method may compute constants A and B from the pilot sample and set probabilities P and R for the choosing step according to the following formulas:

$$P = \begin{cases} D^* & \text{if } A > B \\ Q & \text{if } A \leq B \end{cases} \text{ and } R = \begin{cases} Q/D^* & \text{if } A > B \\ 1 & \text{if } A \leq B' \end{cases}$$

where D* is a constant selected by the user. The choice of D*, as well as the formulas used to compute the constants A and B, may depend both on the specific form of <agg> in Query 1, as well as on the precision and processing speed requirements of the user. For example, suppose that <agg> is equal to COUNT and the user wants to obtain the most precise estimate possible while not exceeding a specified number M of I/O operations. The method may set D* equal to the largest real number between 0 and 1 such that the number of I/O operations associated with sampling nD* pages is less than or equal to M, and may compute A and B according to the following formulas:

$$A = \frac{1}{P'}(z_1 + \cdots + z_k) \text{ and } B = \frac{1}{P'R'}(n_1 + \cdots + n_k),$$

$$z_j = \left(\frac{n_j}{R'}\right)^2 - \frac{1}{R'}\left(\frac{1}{R'} - 1\right)n_j,$$

where
k is the number of pages sampled in the pilot sample, and
$n_j$ is the number of rows sampled from the jth page of the pilot sample that satisfy <predicate>.

If, on the other hand, the user wants to minimize processing time while ensuring that the standard error of the estimated answer to the query does not exceed a specified value S, then the method may compute A and B as above, and set $$D^* = \max\left(Q, \frac{A - B}{S^2 + A - (B/Q)}\right).$$

Other examples of applicable queries and formulas for setting P and R are given in the detailed description of the invention.

The preferred embodiments of the present invention are advantageous as the sampling algorithm described is optimized to increase precision of results while minimizing processing costs. The bi-level Bernoulli sampling algorithm utilizes catalog statistics and/or pilot samples, according to preferred embodiments of the present invention, to adjust for variances and other inconsistencies in the sampled data values, as well as to adjust for the arrangement of the data values being sampled (i.e., number of pages, number of rows per page, number of distinct data values per page). This results in more precise estimates and a decrease in processing requirements.

Further, the bi-level Bernoulli sampling algorithm, according to a preferred embodiment of the present invention, allows for a user-specified upper bound that specifies a maximum number of desired I/O operations, or in some cases a user-specified upper bound that specifies the maximum desired standard error of the estimated query answer. This is beneficial as it allows for the tailoring of the sampling algorithm to obtain specific processing requirement goals.

Further, the bi-level Bernoulli sampling algorithm combines the probability R, for which rows are chosen for sampling (see description of row-level Bernoulli sampling above), the probability P, for which pages are chosen for sampling (see description of page-level Bernoulli sampling above) to obtain an overall probability Q=PR for which rows are chosen for sampling. The combination of row-level Bernoulli sampling and page-level Bernoulli sampling results in a sampling algorithm that exhibits the benefits of each sampling algorithm—precision and lower processing requirements—while downplaying the drawbacks of each sampling algorithm—imprecision and increased processing requirements.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

I. Terminology

To more clearly delineate the present invention, an effort is made throughout the specification to adhere to the following term definitions as consistently as possible.

The term "SQL" refers to Structured Query Language, which is an industry standard language for creating updating and querying relational database management systems.

The term "Bernoulli sampling" refers to a sampling technique wherein the probability that each item in a group is chosen for sampling is P, while the probability that each item in a group is not chosen for sampling is 1-P.

Figure 2:
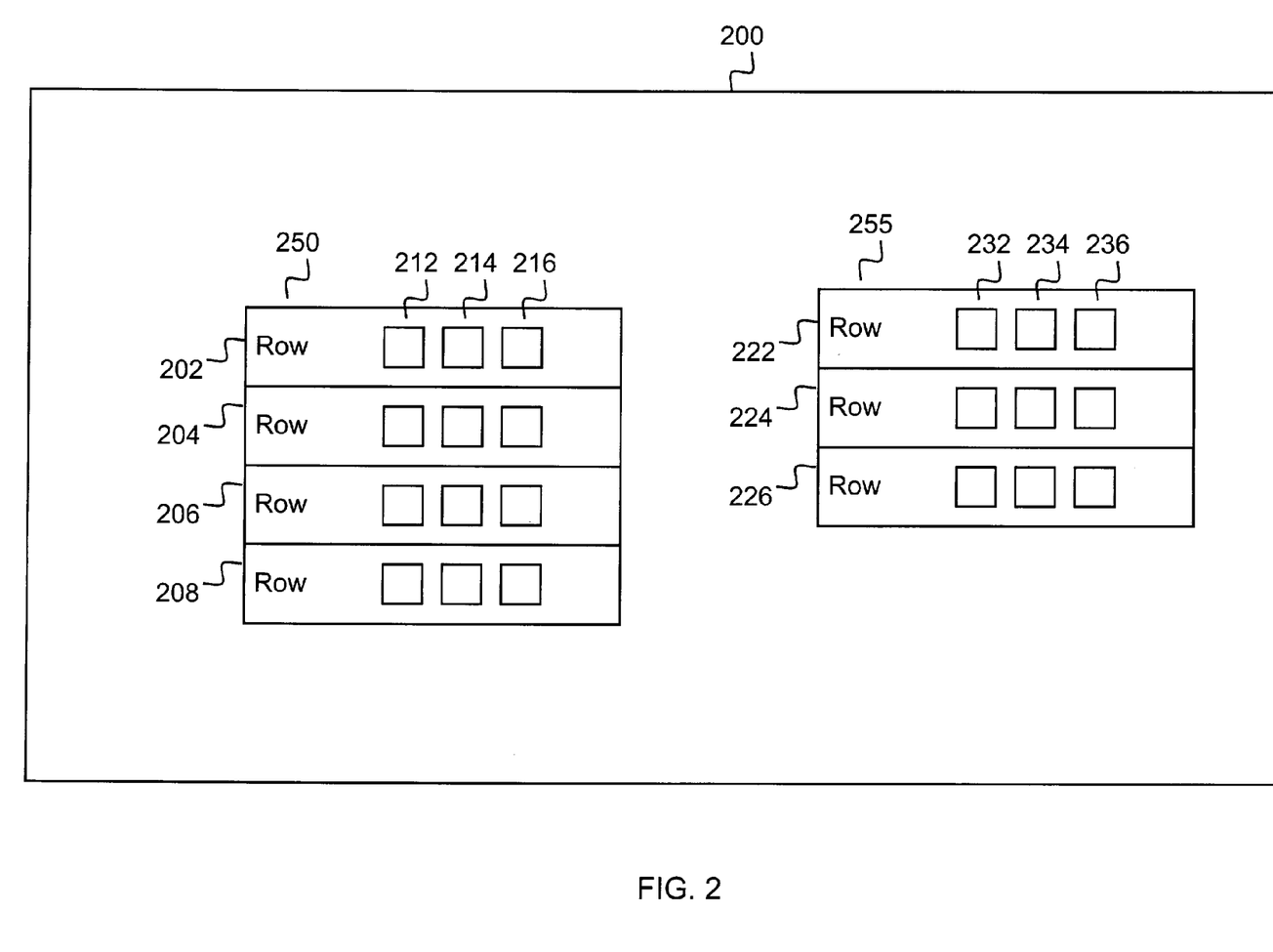
FIG. 2 is a block diagram depicting a table in a relational database, according to one embodiment of the present invention.

The term "row" refers to a group of data values, conceptually arranged horizontally in columns, as shown in FIG. 2, in a relational database.

The term "page" refers to a set or group of data values, typically arranged in a file, record or document. A page may be comprised of one or more rows.

The term "row-level Bernoulli sampling" refers to a Bernoulli sampling technique wherein each row of a table is subjected to the sampling algorithm. A sample of approximately 100×R percent of the rows are selected for sampling by means of a predicate that chooses each row for sampling with probability P and rejects it with probability 1-R.

The term "page-level Bernoulli sampling" refers to a Bernoulli sampling technique similar to row-level Bernoulli sampling, except that pages are sampled rather than rows. Therefore, a page is selected with probability P and rejected with probability 1-P. If a page is selected, all of the rows on the page are selected for sampling.

The term "bi-level Bernoulli sampling" refers to a Bernoulli sampling technique that combines row-level Bernoulli sampling and page-level Bernoulli sampling in order to optimize precision of the estimated query result and processing speed.

The term "standard error" refers to a measure of the precision of an estimate of a number (such as a query result) that is based on sampled data. More specifically, the standard error is defined as the square root of the expected squared difference between the estimated and true results.

The term "clustering" refers to a phenomenon where the data values within a page are about the same, but data values in different pages differ significantly. For example, when contiguous data values are assigned to contiguous pages.

The term "user" refers to a person interacting with a computer system.

The term "server application" refers to a program that is located and executes on the server side of a client-server system. Examples of widely used server applications are: Common Gateway Interface (CGI) scripts, Java servlets, Hypertext Preprocessor (PHP) scripts and Perl scripts.

The term "client application" refers to a program that is located and executes on the client side of a client-server system. Examples of widely used client applications are: Java applets, Java scriptlets, Java scripts and Active X controls.

The term "metadata" refers to additional data about data.

The term "catalog statistics" refers to metadata maintained by a relational database in the database system catalog for the purpose of facilitating subsequent queries of the relational database.

The term "pilot data" refers to a small, representative sample of data of a larger group of data.

II. Overview

The present invention, according to a preferred embodiment, overcomes problems with the prior art by providing an efficient and easy-to-implement method for performing sampling of data in a relational database.

Figure 1:
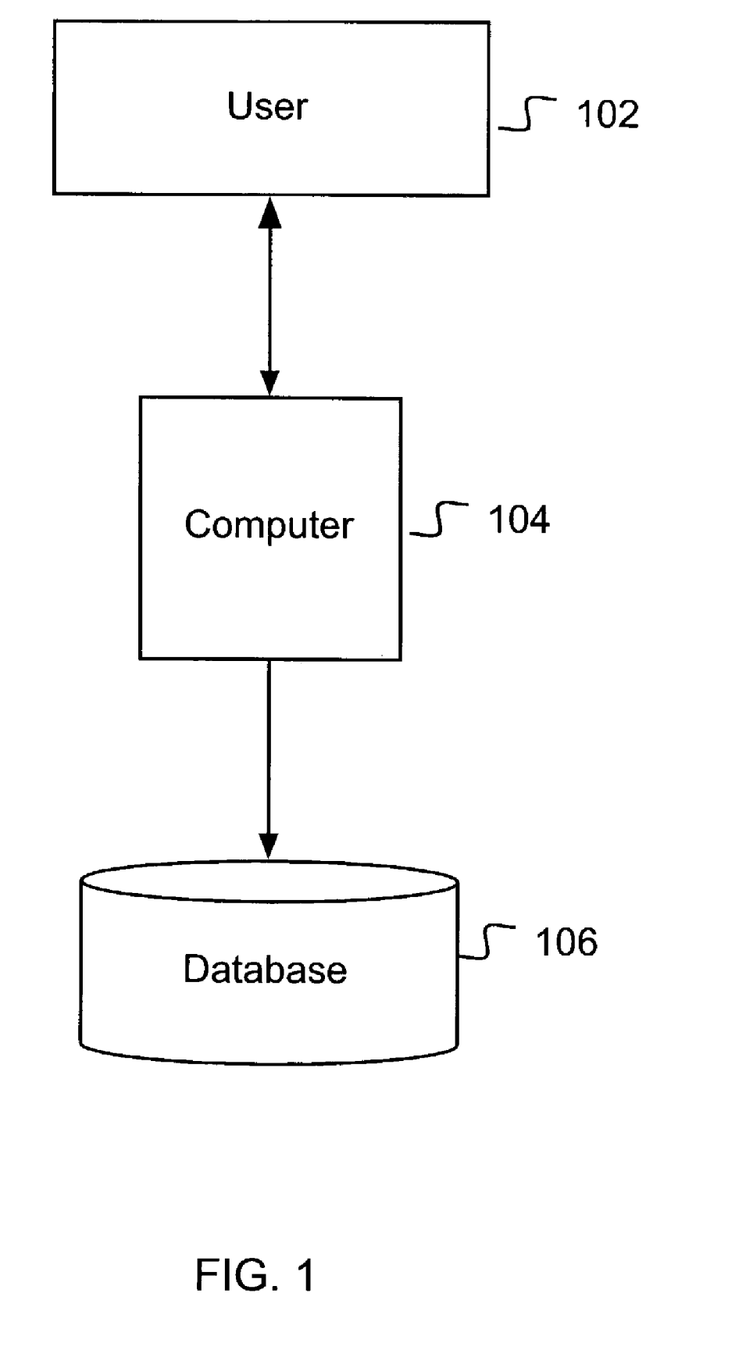
FIG. 1 is a block diagram illustrating the overall system architecture of one embodiment of the present invention.

FIG. 1 is a block diagram illustrating the overall system architecture of one embodiment of the present invention. The exemplary embodiments of the present invention adhere to the system architecture of FIG. 1. A user 102, operating on a client information processing system, or client computer 104 utilizes a client application, such as a database management system (DBMS), on his client computer 104 to interact with the database 106.

In an embodiment of the present invention, the computer system of computer 104 is one or more Personal Computers (PCs) (e.g., IBM or compatible PC workstations running the Microsoft Windows 95/98/2000/ME/CE/NT/XP operating system, Macintosh computers running the Mac OS operating system, or equivalent), Personal Digital Assistants (PDAs), game consoles or any other information processing devices. In another embodiment, the computer system of computer 104 is a server system (e.g., SUN Ultra workstations running the SunOS operating system or IBM RS/6000 workstations and servers running the AIX operating system).

In another embodiment of the present invention, the database 106 is a part of the computer system of computer 104. In yet another embodiment of the present invention, the database 106 is a part of a computer system (such as a server system) separate from computer 104 (a client system). In this embodiment, the computer 104 communicates with the computer system of database 106 over a network or other communication medium.

In yet another embodiment of the present invention, an optional network connects computer 104 and database 106. In one embodiment, the network is a circuit switched network, such as the Public Service Telephone Network (PSTN). In another embodiment, the network is a packet switched network. The packet switched network is a wide area network (WAN), such as the global Internet, a private WAN, a local area network (LAN), a telecommunications network or any combination of the above-mentioned networks. In yet another embodiment, the network is a wired network, a wireless network, a broadcast network or a point-to-point network.

In an embodiment where the database 106 is a part of a server computer system separate from client computer 104, certain data sampling tasks at client computer 104 are performed by a client application, such as a Java applet, a Java scriptlet, Java script, Perl script, an Active X control or any self-sufficient application executing on the computer system of computer 104. Further, certain data sampling tasks at the server system of database 106 are performed by a server application such as a Common Gateway Interface (CGI) script, a Java servlet, a Hypertext Preprocessor (PHP) script, a Perl script or any self-sufficient application executing on the server system of database 106.

FIG. 2 is a block diagram depicting a table in a relational database, according to one embodiment of the present invention. A table consists of one or more rows. A row is a group of data values, conceptually arranged horizontally in columns, as shown in FIG. 2. The rows within a table are grouped into disjoint pages. FIG. 2 shows a detailed view of an exemplary table 200. The table 200 of FIG. 2 comprises two pages 250 and 255. Page 250 comprises four rows 202, 204, 206 and 208 and page 255 comprises three rows 222, 224, and 226. Each row contains three data values, i.e., three columns. For example, row 202 contains data values 212, 214, and 216, and row 222 contains data values 232, 234, and 236. Each row 202, 204, 206, 208, 222, 224, and 226, in this example, includes three data values, such as data values 212, 214 and 216 of row 202, which are conceptually in columns 1, 2, and 3 of the table 200. The columns typically have names that correspond to attributes of the entity represented by the row. For example, each row might correspond to an employee and the columns 1, 2, and 3 might correspond to attributes such as NAME, DEPARTMENT, and SALARY, respectively. Although the pages shown in FIG. 2 comprise seven rows 202, 204, 206, 208, 222, 224, and 226, a page may contain any number of rows. Further, although each row of a page, as shown in the example of FIG. 2, contains only three data values, a row may contain any number of data values. Lastly, the relational database 106 of the present invention may contain any number of tables and pages of data within tables.

III. Bi-Level Bernoulli Sampling

Figure 3:
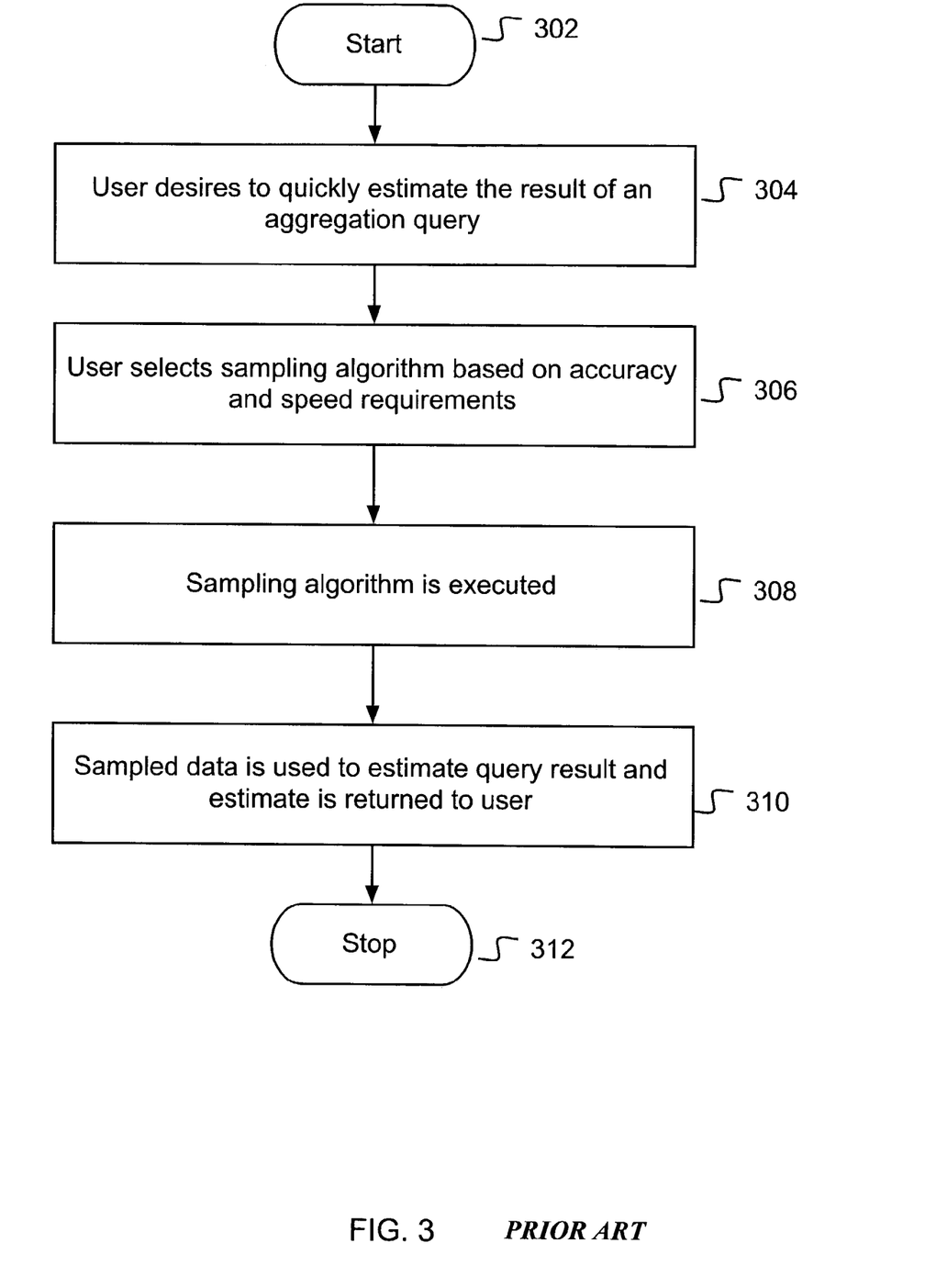
FIG. 3 is a flowchart depicting the operation and control flow of an exemplary conventional process of executing a sampling algorithm on data.

FIG. 3 is a flowchart depicting an exemplary operation and control flow of a conventional process of executing a sampling algorithm on data from a relational database such as database 106. The operation and control flow of FIG. 3 begins with step 302 and proceeds directly to step 304.

In step 304, the user 102 desires to estimate the result of an aggregation query on a relational database such as database 106. In step 306, the user 102 selects a sampling algorithm based on precision and processing speed requirements.

For example, if the user 102 desires to estimate the result of an aggregation query on database 106 quickly and incurring minimal processing costs (i.e., performing minimal processing steps), then the user 102 may choose the page-level Bernoulli sampling algorithm. As explained above, this algorithm is well suited for estimating the result of an aggregation query on a relational database quickly and incurring minimal processing costs. However, the page-level Bernoulli sampling algorithm provides low precision. In another example, if the user 102 desires to estimate the result of an aggregation query on database 106 more precisely regardless of the processing costs, then the user 102 may choose the row-level Bernoulli sampling algorithm. As explained above, this algorithm is well suited for estimating the result of an aggregation query on a relational database more precisely. However, the row-level Bernoulli sampling algorithm incurs increased processing costs.

In step 308, the sampling algorithm chosen by the user 102 in step 306 is executed and proceeds to deliver sampled rows to the database system, such as database 106. In step 310, the sampled rows are used to compute an estimate of the aggregation query and the estimate is returned to the user 102. In step 312, the operation and control flow of FIG. 3 ceases.

Figure 4:
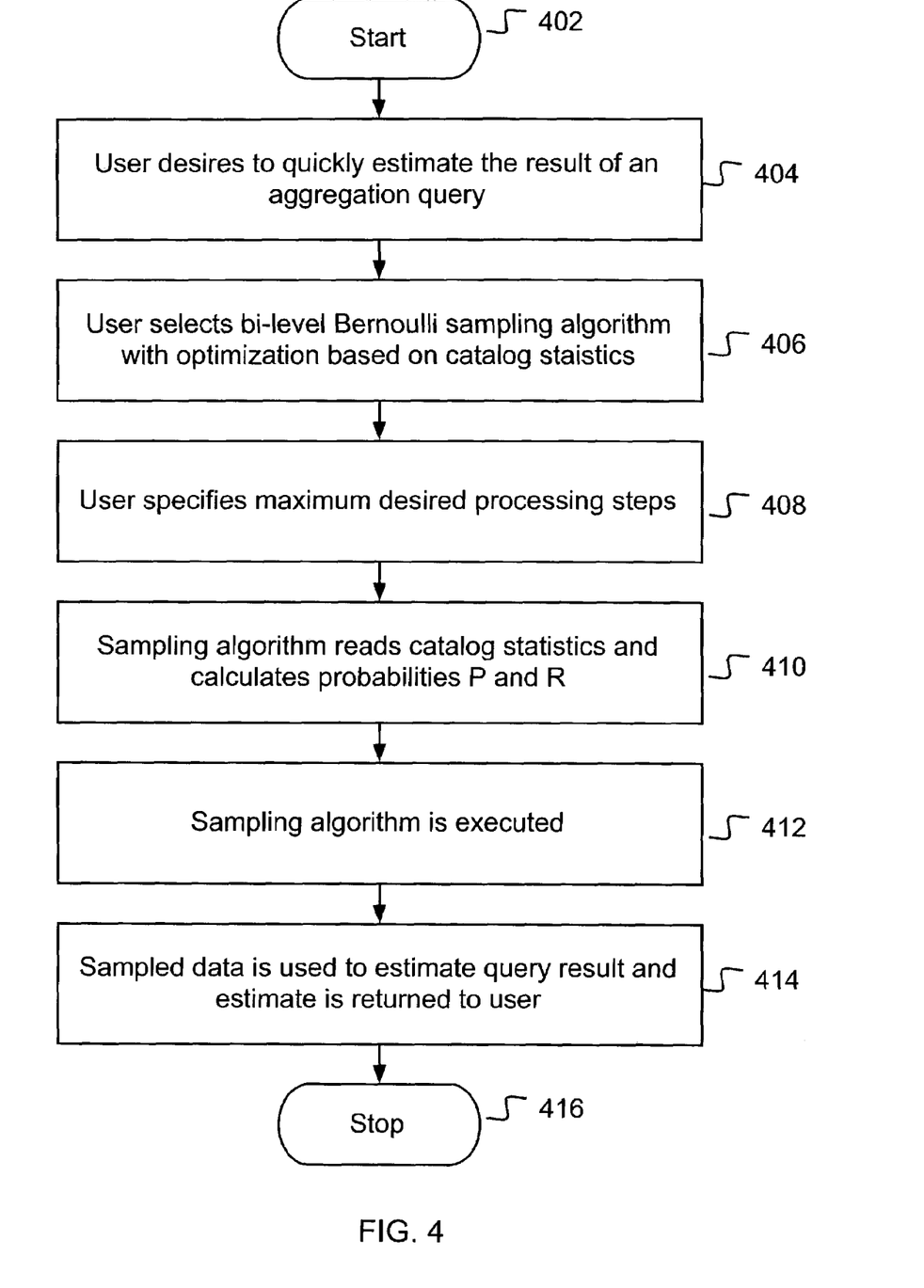
FIG. 4 is a flowchart depicting the operation and control flow of a process of executing a sampling algorithm according to one preferred embodiment of the present invention.

FIG. 4 is a flowchart depicting an operation and control flow of an exemplary process of executing a sampling algorithm according to a preferred embodiment of the present invention. The operation and control flow of FIG. 4 depicts the use of one embodiment of the bi-level Bernoulli sampling algorithm of the present invention. Specifically, the operation and control flow of FIG. 4 depicts the use of the bi-level Bernoulli sampling algorithm using catalog statistics to choose the probability R. This sampling algorithm is optimized to increase precision of results while minimizing processing costs. This is described in greater detail below. The operation and control flow of FIG. 4 begins with step 402 and proceeds directly to step 404.

In step 404, the user 102 desires to estimate the result of an aggregation query on a relational database such as database 106 with an overall row selection probability equal to Q. In step 406, the user 102 selects the bi-level Bernoulli sampling algorithm using catalog statistics to choose the probabilities P and R. In optional step 408, the user 102 specifies a maximum number of I/O operations, designated M.

In step 410, the bi-level Bernoulli sampling algorithm reads catalog statistics from the database 106. Catalog statistics are metadata maintained by a relational database in the database system catalog for the purpose of facilitating subsequent queries of the relational database. If the aggregation query has the form of QUERY 1:
SELECT <agg>(col)
FROM t
WHERE <predicate> where <agg> is one of SUM, AVERAGE, or COUNT, col is a column of a table t and <predicate> is a logical predicate on the attributes of table t (each row in table t either satisfies the predicate or fails to satisfy the predicate), then the bi-level Bernoulli sampling algorithm, according to a preferred embodiment of the present invention, reads the statistics d, m, and v from the system catalog, where for each value of d, f(v,d) is a function that is non-decreasing in v and takes on values ranging from 1/d to 1, for example, $$f(v, d) = 1 + \left(\frac{1}{1+v}\right)\left(\frac{1}{d} - 1\right),$$

and where
  d is the average number of distinct col values per page,
  m is the average number of rows per page,
  v=average($v_1$, . . . , $v_n$)/variance($a_1$, . . . , $a_n$),
  n is the number of pages in the relational database,
  $v_k$ is the variance of the col values on the kth page, and
  $a_k$ is the average of the col values on the kth page.

Also in step 410, the bi-level Bernoulli sampling algorithm calculates the probabilities P and R, where pages are chosen for sampling according to a probability P and, for each selected page, rows on the page are chosen for sampling according to a probability R, so that the overall probability of choosing a row from the table is Q=PR. The probabilities P and R may be defined as:

$R=\max(R_0, Q)$ and $P=Q/R$ where $$R_0 = 1 - (1 - f(v, d))^{d/m}$$

and $$f(v, d) = 1 + \left(\frac{1}{1+v}\right)\left(\frac{1}{d} - 1\right).$$

In another embodiment of the present invention, the bi-level Bernoulli sampling algorithm calculates the probability R while taking into account the maximum number of desired I/O operations, M (assumed less than n, the number of pages in the table), specified by the user 102 in optional step 408. In this case, the probabilities P and R are defined as:

$$R = \max(R_0, nQ/M) \text{ and } P = Q/R$$

In yet another embodiment of the invention, the SELECT clause of the aggregation query may involves u>1 columns, such as a query of the form Query 2:
SELECT SUM(col1*col3), COUNT(col2/col1), COUNT (col4)
FROM t
WHERE <predicate>

(Here u equals 4). Then in step 410 the method as described in the foregoing embodiments is executed separately for each column to produce row sampling probabilities $R_1, \ldots, R_u$ and page sampling probabilities $P_1, \ldots, P_u$, and the probabilities P and R may then be defined as $$R = (R_1 R_2 \ldots R_u)^{1/u} \text{ and } P = (P_1 P_2 \ldots P_u)^{1/u}$$

or as $$R = \max(R_1, \ldots, R_u) \text{ and } P = Q/R.$$

Those of ordinary skill in the art will understand that the foregoing methods for computing P and R extend in a direct way to a wide variety of aggregation queries, not merely those of the same form as Query 1 or Query 2. For example, the foregoing methods can be applied to a query of the form SELECT SUM(suppliers.price*orders.quantity)
FROM suppliers, orders
WHERE
suppliers.product_number=orders.product_number where the orders table is to be sampled and the product_number attribute is a key in the suppliers table. In this case, we store additional catalog statistics which are computed as follows. For each row $r_j$ on a page in the orders table, we find the row s in the products table having the matching value of the product_number attribute, and compute the quantity $q_j = r_j$.quantity×s.price. After repeating these calculations for each page in the table, we compute and store in the catalog the average number d* of distinct $q_j$ values per page of the orders table and the ratio m*=average $(v^*_1, \ldots, v^*_n)$/variance$(a^*_1, \ldots, a^*_n)$, where $v^*_k$ is the variance of the $q_j$ values on the kth page, and $a^*_k$ is the average of the $q_j$ values on the kth page. The statistics d* and m* play the role of the statistics d and m as for col in Query 1.

In step 412, the bi-level Bernoulli sampling algorithm chosen by the user 102 in step 406 is executed according to the probabilities P and R calculated in step 410. The sampling algorithm proceeds to sample rows from the relational database, such as database 106. In step 414, the sampled rows are used to compute an estimate of the aggregation query and the estimate is returned to the user 102. In step 416, the operation and control flow of FIG. 4 ceases.

The bi-level Bernoulli sampling algorithm that uses catalog statistics to choose the probabilities P and R, as described in the operation and control flow of FIG. 4, is advantageous as it is optimized to increase precision of results while minimizing processing costs. The bi-level Bernoulli sampling algorithm utilizes catalog statistics to adjust for variances and other inconsistencies in the sampled data values, as well as to adjust for the arrangement of the data values being sampled (i.e., number of pages, number of rows per page, number of distinct data values per page). This results in more precise estimates and a decrease in processing requirements.

Further, the bi-level Bernoulli sampling algorithm that uses catalog statistics to choose the probabilities P and R also allows for a user-specified upper bound M, which specifies a maximum number of desired I/O operations. This is beneficial as it allows for the tailoring of the sampling algorithm to obtain specific processing requirement goals.

Further, the bi-level Bernoulli sampling algorithm above combines the probability R, for which rows are chosen for sampling (see description of row-level Bernoulli sampling above), the probability P, for which pages are chosen for sampling (see description of page-level Bernoulli sampling above) to obtain an overall probability Q=PR for which rows are chosen for sampling. The combination of row-level Bernoulli sampling and page-level Bernoulli sampling results in a sampling algorithm that exhibits the benefits of each sampling algorithm—precision and lower processing requirements—while downplaying the drawbacks of each sampling algorithm—imprecision and increased processing requirements.

Figure 5:
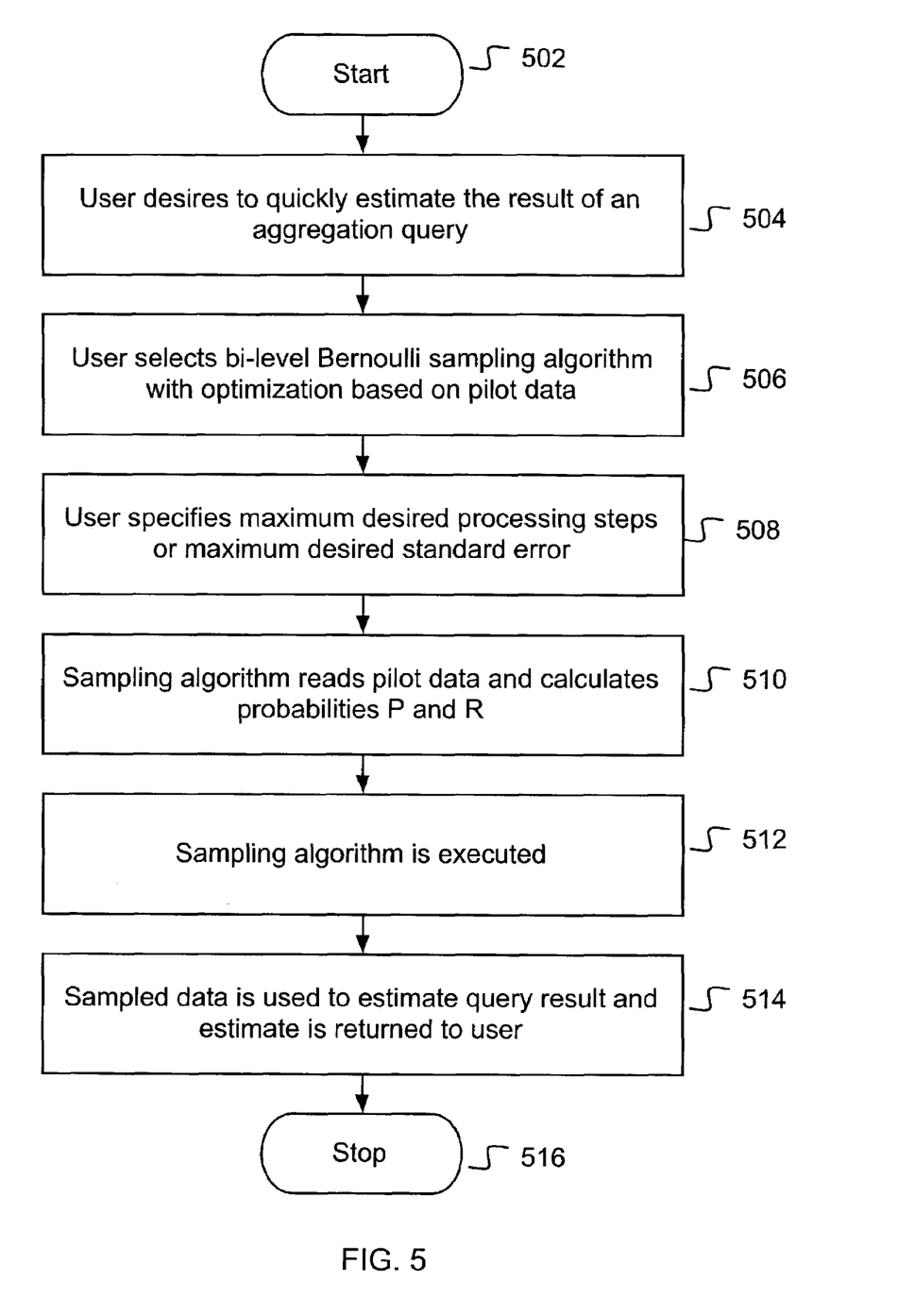
FIG. 5 is a flowchart depicting the operation and control flow of a process of executing a sampling algorithm according to another preferred embodiment of the present invention.

FIG. 5 is a flowchart depicting the operation and control flow of an exemplary process of executing the sampling algorithm according to another preferred embodiment of the present invention. The operation and control flow of FIG. 5 depicts the use of another embodiment of the bi-level Bernoulli sampling algorithm of the present invention. Specifically, the operation and control flow of FIG. 5 depicts the use of the bi-level Bernoulli sampling algorithm using a pilot sample to choose the probabilities P and R. This sampling algorithm is also optimized to increase precision of results while minimizing processing costs. This is described in greater detail below. The operation and control flow of FIG. 5 begins with step 502 and proceeds directly to step 504.

In step 504, the user 102 desires to estimate the result of an aggregation query on a relational database such as database 106 with an overall row selection probability equal to Q. In step 506, the user 102 selects the bi-level Bernoulli sampling algorithm using a pilot sample to choose the probabilities P and R. In step 508, the user 102 specifies either a maximum number of desired I/O operations, designated M, or a maximum desired standard error, designated S.

In step 510, the bi-level Bernoulli sampling algorithm reads pilot data from the database 106. Pilot data is a small, representative sample of data of a larger group of data. In this case, pages are chosen for sampling according to a probability P' and rows from each selected page are chosen for sampling according to a probability R'. Further, the method may compute constants A and B from the pilot sample and set probabilities P and R for the choosing step according to the following formulas:

$$P = \begin{cases} D^* & \text{if } A > B \\ Q & \text{if } A \le B \end{cases} \text{ and } R = \begin{cases} Q/D^* & \text{if } A > B \\ 1 & \text{if } A \le B' \end{cases}$$

where D* is a constant selected by the user. The choice of D*, as well as the formulas used to compute the constants A and B, may depend both on the specific form of the aggregation query, as well as on the precision and processing speed requirements of the user. For example, if the query has the form of Query 1 and the user wants to obtain the most precise estimate possible while not exceeding M I/O operations, as specified in step 508, then the method may set D* equal to the largest real number between 0 and 1 such that the number of I/O operations associated with sampling nD* pages is less than or equal to M. If, on the other hand, the user wants to minimize processing time while ensuring that the standard error of the estimated answer to the query does not exceed a value S specified in step 508, then the method may set $$D^* = \max\left(Q, \frac{A-B}{S^2 + A - (B/Q)}\right).$$

Moreover, if <agg> is equal to COUNT in Query 1, then the method may compute A and B as $A=A_1$ and $B=B_1$, where $A_1$ and $B_1$ are computed according to the following formulas:

$$A_1 = \frac{1}{P'}(z_1 + \cdots + z_k) \text{ and } B_1 = \frac{1}{P'R'}(n_1 + \cdots + n_k),$$

$$z_j = \left(\frac{n_j}{R'}\right)^2 - \frac{1}{R'}\left(\frac{1}{R'} - 1\right)n_j,$$

where k is the number of pages sampled in the pilot sample, $n_j$ is the number of rows sampled from the jth page of the pilot sample that satisfy <predicate>.

If <agg> is equal to SUM in Query 1, then the method may compute A and B as $A=A_2$ and $B=B_2$ where $A_2$ and $B_2$ are computed according to the following formulas:

$$A_2 = \frac{1}{P'}(y_1 + \cdots + y_k) \text{ and } B_2 = \frac{1}{P'R'}(h_1 + \cdots + h_k),$$

$$y_j = \left(\frac{g_j}{R'}\right)^2 - \frac{1}{R'}\left(\frac{1}{R'} - 1\right)h_j,$$

where $g_j$ is the sum of the col values from those rows sampled from the jth page of the pilot sample that satisfy <predicate>, and $h_j$ is the sum of the squared col values from those rows sampled from the jth page of the pilot sample that satisfy <predicate>.

If <agg> is equal to AVERAGE in Query 1, then the method may compute A and B according to the following formulas:

$$A = \left(\frac{P'R'}{n_1 + \cdots + n_k}\right)^2 (A_2 - 2uA_3 + u^2 A_1) \text{ and}$$

$$B = \left(\frac{P'R'}{n_1 + \cdots + n_k}\right)^2 (B_2 - 2uB_3 + u^2 B_1)$$

$$A_3 = \frac{1}{P'}(x_1 + \cdots + x_k) \text{ and } B_3 = \frac{1}{P'R'}(g_1 + \cdots + g_k),$$

$$x_j = \left(\frac{g_j}{R'}\right)\left(\frac{n_j}{R'}\right) - \frac{1}{R'}\left(\frac{1}{R'} - 1\right)g_j,$$

$$u = \frac{g_1 + \cdots + g_k}{n_1 + \cdots + n_k}.$$

In yet another embodiment of the pilot-sample method, the SELECT clause of the query contains u>1 aggregate expressions as, for example, in Query 2. (Here u equals 3, because there is one SUM expression and two COUNT expressions.) Then in step 510 the method as described in the foregoing embodiment is executed separately for each aggregate column to produce constants $A^{(1)}, \ldots, A^{(u)}$, $B^{(1)}, \ldots, B^{(u)}, P^{(1)}, \ldots, P^{(u)},$ and $R^{(1)}, \ldots, R^{(u)}$. These constants are combined according to one of several possible methods to produce a value of P and R. One possible method computes A and B as $A=\text{average}(A^{(1)}, \ldots, A^{(u)})$ and $B=\text{average}(B^{(1)}, \ldots, B^{(u)})$ and then computes $$P = \begin{cases} D^* & \text{if } A > B \\ Q & \text{if } A \le B \end{cases} \text{ and } R = \begin{cases} Q/D^* & \text{if } A > B \\ 1 & \text{if } A \le B \end{cases}$$

as described previously. Another possible method computes $$c = \max(A^{(1)}/B^{(1)}, \ldots A^{(u)}/B^{(u)})$$

and then sets $$P = \begin{cases} D^* & \text{if } c > 1 \\ Q & \text{if } c \le 1 \end{cases} \text{ and } R = \begin{cases} Q/D^* & \text{if } c > 1 \\ 1 & \text{if } c \le 1 \end{cases}.$$

Yet another method defines probabilities P and R as $$R = (R_1 R_2 \ldots R_u)^{1/u} \text{ and } P = (P_1 P_2 \ldots P_u)^{1/u}$$

or as $$R = \max(R_1, \ldots, R_u) \text{ and } P = Q/R.$$

Still another method—applicable when the user wishes to minimize the standard error while ensuring that the number of I/O operations does not exceed a constant M specified in step 508—finds the solution (x*,y*) to the following linear programming problem using methods known to those of ordinary skill in the art:

$$\underset{x,y}{\text{maximize }} y$$

subject to $$(n/D^*) \le x \le (1/Q)$$

$$y \ge u^{(i)} x + w^{(i)} \text{ for } i = 1, 2, \ldots, u$$

where $$u^{(i)} = \frac{A^{(i)} - B^{(i)}}{(1/Q) - 1} \text{ and } w^{(i)} = \frac{(B^{(i)}/Q) - A^{(i)}}{(1/Q) - 1}.$$

Here n is, as before, the number of pages in the table and D* is equal to the largest real number between 0 and 1 such that the number of I/O operations associated with sampling nD* pages is less than or equal to M. The probabilities P and R are then computed as $$P = \frac{1}{x^*} \text{ and } R = \frac{Q}{P}.$$

In yet another embodiment of the pilot-sample method, the user does not specify a required overall row sampling probability Q. In this case the method first computes the constant A from the pilot sample using any of the methods described above. If the user wants to obtain the most precise estimate possible while not exceeding M I/O operations specified in step 508, then the method may set P=D* and R=1, where D* is equal to the largest real number between 0 and 1 such that the number of I/O operations associated with sampling nD* pages is less than or equal to M. If, on the other hand, the user wants to minimize processing time while ensuring that the standard error of the estimated answer to the query does not exceed a value S specified in step 508, then the method may set $$P = \frac{A}{S^2 + A}$$

and R=1.

Those of ordinary skill in the art will understand that the foregoing methods for computing P and R extend in a straightforward way to a wide variety of aggregation queries, not merely those of the same form as Query 1 or Query 2. For example, the foregoing methods can be applied to a query of the form SELECT SUM(suppliers.price*orders.quantity)
FROM suppliers, orders
WHERE
suppliers.product_number=orders.product_number where the orders table is to be sampled and the product_number attribute is a key in the suppliers table. In this example, the foregoing methods apply with the quantity suppliers.price*orders.quantity playing the role of col in Query 1.

In step 512, the bi-level Bernoulli sampling algorithm chosen by the user 102 in step 506 is executed according to the probabilities P and R calculated in step 510. The sampling algorithm proceeds to sample rows from the relational database, such as database 106. In step 514, the sampled rows are used to compute an estimate of the aggregation query and the estimate is returned to the user 102. In step 516, the operation and control flow of FIG. 5 ceases.

The bi-level Bernoulli sampling algorithm that uses pilot data to choose the probabilities P and R, as described in the operation and control flow of FIG. 5, is advantageous as it is optimized to increase precision of results while minimizing processing costs. The bi-level Bernoulli sampling algorithm utilizes pilot data to adjust for variances and other inconsistencies in the sampled data values, as well as to adjust for the arrangement of the data values being sampled (i.e., number of pages, number of rows per page, number of distinct data values per page). This results in more precise estimates and a decrease in processing requirements.

Further, the bi-level Bernoulli sampling algorithm that uses pilot data to choose the probabilities P and R also allows for either a user-specified upper bound M, which specifies a maximum number of desired processing steps, or a user-specified upper bound S, which specifies a maximum desired standard error for the estimated query result. This is beneficial as it allows for the tailoring of the sampling algorithm to obtain specific processing requirement goals.

Further the bi-level Bernoulli sampling algorithm discussed above combines the probability R, for which rows are chosen for sampling (see description of row-level Bernoulli sampling above), the probability P, for which pages are chosen for sampling (see description of page-level Bernoulli sampling above) to obtain an overall probability Q=PR for which rows are chosen for sampling. The combination of row-level Bernoulli sampling and page-level Bernoulli sampling results in a sampling algorithm that exhibits the benefits of each sampling algorithm—precision and lower processing requirements—while downplaying the drawbacks of each sampling algorithm—imprecision and increased processing requirements.

IV. Exemplary Implementations

The present invention can be realized in hardware, software, or a combination of hardware and software in computer 104 or the computer system of database 106 of FIG. 1. A system according to a preferred embodiment of the present invention can be realized in a centralized fashion in one computer system, or in a distributed fashion where different elements' are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product (in computer 104 or the computer system of database 106), which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 6:
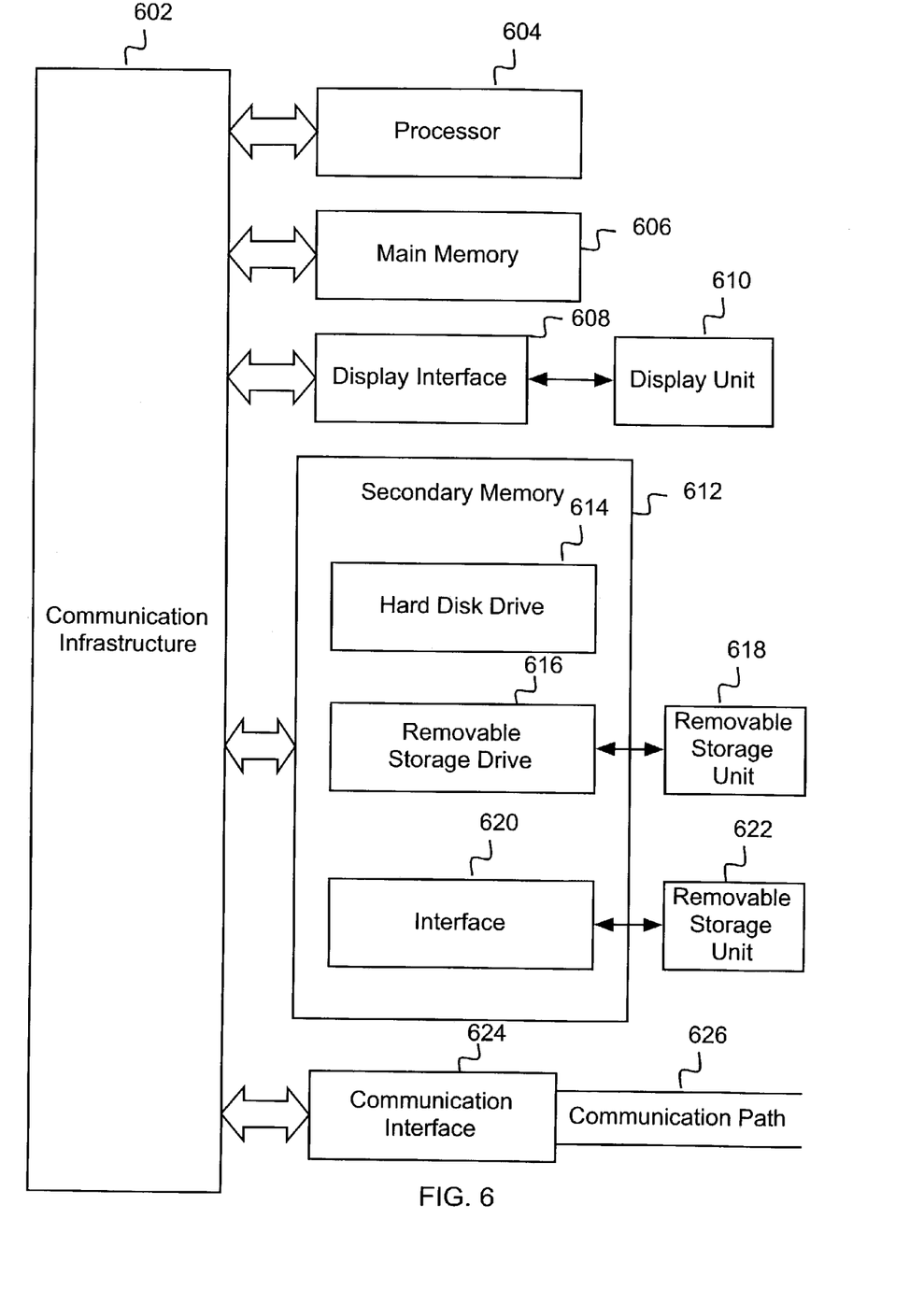
FIG. 6 is a block diagram of a computer system according to a preferred embodiment of the present invention.

FIG. 6 is a block diagram of a computer system useful for implementing an embodiment of the present invention. The computer system of FIG. 6 is a more detailed representation of the computer 104 or the computer system of database 106. The computer system of FIG. 6 includes one or more processors, such as processor 604. The processor 604 is connected to a communication infrastructure 602 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 608 that forwards graphics, text, and other data from the communication infrastructure 602 (or from a frame buffer not shown) for display on the display unit 610. The computer system also includes a main memory 606, preferably random access memory (RAM), and may also include a secondary memory 612. The secondary memory 612 may include, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a manner well known to those having ordinary skill in the art. Removable storage unit 618, represents, for example, a floppy disk, magnetic tape, optical disk, etc. which is read by and written to by removable storage drive 616. As will be appreciated, the removable storage unit 618 includes a computer usable storage medium having stored therein computer software and/or data.

In alternative embodiments, the secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computer system.

The computer system may also include a communications interface 624. Communications interface 624 allows software and data to be transferred between the computer system and external devices. Examples of communications interface 624 may include a modem, a network interface (such as an Ethernet card), a communications port, a PCM-CIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (i.e., channel) 626. This channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 606 and/or secondary memory 612. Computer programs may also be received via communications interface 624. Such computer programs, when executed, enable the computer system to perform the features of the present invention as discussed herein. In particular, the computer programs, when executed, enable the processor 604 to perform the features of the computer system. Accordingly, such computer programs represent controllers of the computer system.

V. Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for sampling data from a relational database, comprising:

choosing rows from a relational database for sampling, wherein rows are arranged into pages and include column values, pages are arranged into tables and tables comprise rows and columns;

wherein pages are chosen for sampling according to a probability P and rows on each selected page are chosen for sampling according to a probability R, so that an overall probability of choosing a row for sampling is Q=PR; and wherein P and R are based on desired processing speed and desired precision.

2. The method of claim 1, wherein R is further based on catalog statistics of the relational database.

3. The method of claim 2, wherein a query for sampling is of the form:

SELECT <agg>(col)

FROM t

WHERE <predicate> and P and R are further defined as:

$R=\max(R_0, Q)$ and $P=Q/R$, $R_0 = 1-(1-f(v,d))^{d/m}$, $$f(v, d) = 1 + \left(\frac{1}{1+v}\right)\left(\frac{1}{d} - 1\right),$$

where for each value of d, f(v,d) is a function that is non-decreasing in v and takes on values ranging from 1/d to 1,
and where
  d is an average number of distinct column values per page,
  m is an average number of rows per page,
  v=average($v_1, \ldots, v_n$)/variance($a_1, \ldots, a_n$),
  n is a number of pages in the relational database,
  $v_k$ is a variance of column values on the kth page, and
  $a_k$ is a average of column values on the kth page.

4. The method of claim 3, wherein P and R are further defined as:

$R=\max(R_0, nQ/M)$ and $P=Q/R$ where M is a maximum desired number of I/O operations.

5. The method of claim 2, wherein a SELECT clause involves u>1 columns, as in a query of the form:
  SELECT SUM(col1*col3), COUNT(col2/col1), COUNT(col4)
  FROM t
  WHERE <predicate>
, and P and R are further defined as any one of:

$R=(R_1 R_2 \ldots R_u)^{1/u}$ and $P=(P_1 P_2 \ldots P_u)^{1/u}$ and $R=\max(R_1, \ldots, R_u)$ and $P=Q/R$, where $R_1, \ldots, R_u$ are row sampling probabilities and $P_1, \ldots, P_u$ are page sampling probabilities computed for individual columns.

6. The method of claim 1, wherein P and R are further based on a pilot sample of rows from the relational database.

7. The method of claim 6, wherein a query for sampling is of the form:
  SELECT <agg>(col)
  FROM t
  WHERE <predicate>
and further comprising a step before the choosing step of:
  calculating a pilot sample of the column values in the relational database such that pages are chosen for sampling according to a probability P', rows are chosen for sampling according to a probability R', and then computing the quantities P and R according to $$P = \begin{cases} D^* & \text{if } A > B \\ Q & \text{if } A \leq B \end{cases} \text{ and } R = \begin{cases} Q/D^* & \text{if } A > B \\ 1 & \text{if } A \leq B \end{cases},$$

where D* is selected from one of:
  D* is equal to a largest real number between 0 and 1 such that a number of I/O operations associated with sampling nD* pages is less than or equal to M if a most precise estimate possible is desired while not exceeding M I/O operations, and $$D^* = \max\left(Q, \frac{A-B}{S^2 + A - (B/Q)}\right)$$

if minimal processing time is desired while ensuring that a standard error of an estimated answer to the query does not exceed a value S, and A and B are computed as one of the following:
  $A=A_1$ and $B=B_1$, and
  $A=A_2$ and $B=B_2$, and $$A = \left(\frac{P'R'}{n_1 + \cdots + n_k}\right)^2 (A_2 - 2uA_3 + u^2 A_1) \text{ and } B =$$

$$\left(\frac{P'R'}{n_1 + \cdots + n_k}\right)^2 (B_2 - 2uB_3 + u^2 B_1)$$

if <agg> is equal to COUNT, SUM, or AVERAGE, respectively, where $$A_1 = \frac{1}{P'}(z_1 + \cdots + z_k) \text{ and } B_1 = \frac{1}{P'R'}(n_1 + \cdots + n_k),$$

$$z_j = \left(\frac{n_j}{R'}\right)^2 - \frac{1}{R'}\left(\frac{1}{R'} - 1\right)n_j,$$

$$A_2 = \frac{1}{P'}(y_1 + \cdots + y_k) \text{ and } B_2 = \frac{1}{P'R'}(h_1 + \cdots + h_k),$$

$$y_j = \left(\frac{g_j}{R'}\right)^2 - \frac{1}{R'}\left(\frac{1}{R'} - 1\right)h_j,$$

$$A_3 = \frac{1}{P'}(x_1 + \cdots + x_k) \text{ and } B_3 = \frac{1}{P'R'}(g_1 + \cdots + g_k),$$

$$x_j = \left(\frac{g_j}{R'}\right)\left(\frac{n_j}{R'}\right) - \frac{1}{R'}\left(\frac{1}{R'} - 1\right)g_j,$$

$$u = \frac{g_1 + \cdots + g_k}{n_1 + \cdots + n_k},$$

k is a number of pages sampled in the pilot sample,
$n_j$ is a number of rows sampled from the jth page of the pilot sample that satisfy <predicate>,
$g_j$ is a sum of the column values from those rows sampled from the jth page of the pilot sample that satisfy <predicate>, and
$h_j$ is a sum of the squared column values from those rows sampled from the
jth page of the pilot sample that satisfy <predicate>.

8. The method of claim 6, wherein the SELECT clause of the query contains u>1 aggregate expressions and P and R are defined as any one of:

$$P = \begin{cases} D^* & \text{if } \overline{A} > \overline{B} \\ Q & \text{if } \overline{A} \leq \overline{B} \end{cases} \text{ and } R = \begin{cases} Q/D^* & \text{if } \overline{A} > \overline{B} \\ 1 & \text{if } \overline{A} \leq \overline{B} \end{cases}$$

and $$P = \begin{cases} D^* & \text{if } c > 1 \\ Q & \text{if } c \leq 1 \end{cases} \text{ and } R = \begin{cases} Q/D^* & \text{if } c > 1 \\ 1 & \text{if } c \leq 1 \end{cases}$$

and $R=(R_1 R_2 \ldots R_u)^{1/u}$ and $P=(P_1 P_2 \ldots P_u)^{1/u}$ and $R=\max(R_1, \ldots, R_u)$ and $P=Q/R$ and $$P = \frac{1}{x^*} \text{ and } R = \frac{Q}{P'}$$

where $\overline{A}$=average($A^{(1)}, \ldots, A^{(u)}$) and $\overline{B}$=average($B^{(1)}, \ldots, B^{(u)}$), c=max ($A^{(1)}/B^{(1)}, \ldots, A^{(u)}/B^{(u)}$), n is a number of pages in the table, M is a maximum desired number of I/O operations, D' is equal to a largest real number between 0 and 1 such that a number of I/O operations associated with sampling nD' pages is less than or equal to M, and (x*,y*) is a solution to the following problem:

$$\underset{x,y}{\text{maximize }} y$$

subject to $$(n/D') \leq x \leq (1/Q)$$

$$y \geq \left(\frac{A^{(i)} - B^{(i)}}{(1/Q) - 1}\right)X + \left(\frac{(B^{(i)}/Q) - A^{(i)}}{(1/Q) - 1}\right) \text{ for } i = 1, 2, \ldots, u.$$

9. The method of claim 6, wherein
a query for sampling is of the form:
SELECT <agg>(col)
FROM t
WHERE <predicate>;
there is no desired overall row sampling probability Q;
P and R are defined as any one of:
P=D* and R=1, if a most precise sampling is desired while not exceeding M
I/O operations; and $$P = \frac{A}{S^2 + A}$$

and R=1,
if minimal processing time is desired while ensuring that a standard error of an estimated answer to the query does not exceed a value S,
wherein D* is equal to a largest real number between 0 and 1 such that a number of I/O operations associated with sampling nD* pages is less than or equal to M.

10. A computer readable medium including computer instructions for sampling data from a relational database, the computer instructions including instructions for:
choosing rows from a relational database for sampling, wherein rows are arranged into pages and include column values, pages are arranged into tables and tables comprise rows and columns;
wherein pages are chosen for sampling according to a probability P and rows on each selected page are chosen for sampling according to a probability R, so that an overall probability of choosing a row for sampling is Q=PR; and
wherein P and R are based on desired processing speed and desired precision.

11. The computer readable medium of claim 10, wherein R is further based on catalog statistics of the relational database.

12. The computer readable medium of claim 11, wherein a query for sampling is of the form:
SELECT <agg>(col)
FROM t
WHERE <predicate>
and P and R are further defined as:

$$R=\max(R_0, Q) \text{ and } P=Q/R,$$

$$R_0=1-(1-f(v,d))^{d/m},$$

$$f(v, d) = 1 + \left(\frac{1}{1+v}\right)\left(\frac{1}{d} - 1\right),$$

where for each value of d, f(v,d) is a function that is non-decreasing in v and takes on values ranging from 1/d to 1,
and where
d is an average number of distinct column values per page,
m is an average number of rows per page,
v=average($v_1, \ldots, v_n$)/variance($a_1, \ldots, a_n$),
n is a number of pages in the relational database,
$v_k$ is a variance of column values on the kth page, and
$a_k$ is a average of column values on the kth page.

13. The computer readable medium of claim 12, wherein P and R are further defined as:

$$R=\max(R_0, nQ/M) \text{ and } P=Q/R$$

where M is a maximum desired number of I/O operations.

14. The computer readable medium of claim 11, wherein a SELECT clause involves u>1 columns, as in a query of the form:
SELECT SUM(col1*col3), COUNT(col2/col1), COUNT (col4)
FROM t
WHERE <predicate>
, and P and R are further defined as any one of:

$$R=(R_1 R_2 \ldots R_u)^{1/u} \text{ and } P=(P_1 P_2 \ldots P_u)^{1/u}$$

and $$R=\max(R_1, \ldots, R_u) \text{ and } P=Q/R,$$

where $R_1, \ldots, R_u$ are row sampling probabilities and $P_1, \ldots, P_u$ are page sampling probabilities computed for individual columns.

15. The computer readable medium of claim 10, wherein P and R are further based on a pilot sample of rows from the relational database.

16. The computer readable medium of claim 15, wherein a query for sampling is of the form:
SELECT <agg>(col)
FROM t
WHERE <predicate>
and further comprising computer instructions for:
calculating a pilot sample of the column values in the relational database such that pages are chosen for sampling according to a probability P', rows are chosen for sampling according to a probability R', and then computing the quantities P and R according to $$P = \begin{cases} D^* & \text{if } A > B \\ Q & \text{if } A \le B \end{cases} \text{ and } R = \begin{cases} Q/D^* & \text{if } A > B \\ 1 & \text{if } A \le B \end{cases},$$

where D* is computed according to one of the following:
  D* is equal to a largest real number between 0 and 1 such that a number of I/O operations associated with sampling nD pages is less than or equal to M if a most precise estimate possible is desired while not exceeding M I/O operations, and $$D^* = \max\left(Q, \frac{A - B}{S^2 + A - (B/Q)}\right)$$

if minimal processing time is desired while ensuring that a standard error of an estimated answer to the query does not exceed a value S, and A and B are computed as $A = A_1$ and $B = B_1$, or $A = A_2$ and $B = B_2$, or $$A = \left(\frac{P'R'}{n_1 + \cdots + n_k}\right)^2 (A_2 - 2uA_3 + u^2 A_1) \text{ and}$$

$$B = \left(\frac{P'R'}{n_1 + \cdots + n_k}\right)^2 (B_2 - 2uB_3 + u^2 B_1)$$

if <agg> is equal to COUNT, SUM, or AVERAGE, respectively, where $$A_1 = \frac{1}{P'}(z_1 + \cdots + z_k) \text{ and } B_1 = \frac{1}{P'R'}(n_1 + \cdots + n_k),$$

$$z_j = \left(\frac{n_j}{R'}\right)^2 - \frac{1}{R'}\left(\frac{1}{R'} - 1\right) n_j,$$

$$A_2 = \frac{1}{P'}(y_1 + \cdots + y_k) \text{ and } B_2 = \frac{1}{P'R'}(h_1 + \cdots + h_k),$$

$$y_j = \left(\frac{g_j}{R'}\right)^2 - \frac{1}{R'}\left(\frac{1}{R'} - 1\right) h_j,$$

$$A_3 = \frac{1}{P'}(x_1 + \cdots + x_k) \text{ and } B_3 = \frac{1}{P'R'}(g_1 + \cdots + g_k),$$

$$x_j = \left(\frac{g_j}{R'}\right)\left(\frac{n_j}{R'}\right) - \frac{1}{R'}\left(\frac{1}{R'} - 1\right) g_j,$$

$$u = \frac{g_1 + \cdots + g_k}{n_1 + \cdots + n_k},$$

k is a number of pages sampled in the pilot sample,
$n_j$ is a number of rows sampled from the jth page of the pilot sample that satisfy <predicate>,
$g_j$ is a sum of the column values from those rows sampled from the jth page of the pilot sample that satisfy <predicate>, and
$h_j$ is a sum of the squared column values from those rows sampled from the jth page of the pilot sample that satisfy <predicate>.

17. The computer readable medium of claim 15, wherein the SELECT clause of the query contains u>1 aggregate expressions and P and R are defined as any one of:

$$P = \begin{cases} D^* & \text{if } \overline{A} > \overline{B} \\ Q & \text{if } \overline{A} \le \overline{B} \end{cases} \text{ and } R = \begin{cases} Q/D^* & \text{if } \overline{A} > \overline{B} \\ 1 & \text{if } \overline{A} \le \overline{B} \end{cases}$$

and $$P = \begin{cases} D^* & \text{if } c > 1 \\ Q & \text{if } c \le 1 \end{cases} \text{ and } R = \begin{cases} Q/D^* & \text{if } c > 1 \\ 1 & \text{if } c \le 1 \end{cases}$$

and $R = (R_1 R_2 \ldots R_u)^{1/u}$ and $P = (P_1 P_2 \ldots P_u)^{1/u}$ and $R = \max(R_1, \ldots, R_u)$ and $P = Q/R$ and $$P = \frac{1}{x^*} \text{ and } R = \frac{Q}{P'}$$

where
$\overline{A}$ = average($A^{(1)}, \ldots, A^{(u)}$) and $\overline{B}$ = average($B^{(1)}, \ldots, B^{(u)}$),
$c = \max(A^{(1)}/B^{(1)}, \ldots, A^{(u)}/B^{(u)})$,
n is a number of pages in the table,
M is a maximum desired number of I/O operations,
D' is equal to a largest real number between 0 and 1 such that a number of I/O operations associated with sampling nD' pages is less
than or equal to M, and
$(x^*, y^*)$ is a solution to the following problem:

$$\underset{x,y}{\text{maximize}} \; y$$

subject to $(n/D') \le x \le (1/Q)$ $$y \ge \left(\frac{A^{(i)} - B^{(i)}}{(1/Q) - 1}\right) x + \left(\frac{(B^{(i)}/Q) - A^{(i)}}{(1/Q) - 1}\right) \text{ for } i = 1, 2, \ldots, u.$$

18. The computer readable medium of claim 15, wherein a query for sampling is of the form:
SELECT <agg>(col)
FROM t
WHERE <predicate>;
there is no desired overall row sampling probability Q;
P and R are defined as any one of:
P=D* and R=1 if a most precise sampling is desired while not exceeding M I/O operations; and $$P = \frac{A}{S^2 + A}$$

and R=1 if minimal processing time is desired while ensuring that a standard error of an estimated answer to the query does not exceed a value S, wherein $D^*$ is equal to a largest real number between 0 and 1 such that a number of I/O operations associated with sampling $nD^*$ pages is less than or equal to M.

19. A computer system for sampling data from a relational database, comprising:

a relational database including tables comprising rows and columns, wherein rows are arranged into pages and include column values, and pages are arranged into tables; and a processor for choosing rows from a relational database for sampling, wherein rows are arranged into pages and include data values, pages are arranged into tables and tables comprise rows and columns;

wherein pages are chosen for sampling according to a probability P and rows on each selected page are chosen for sampling according to a probability R, so that an overall probability of choosing a row for sampling is Q=PR; and wherein P and R are based on desired processing speed and desired precision.

20. The computer system of claim 19, wherein R is further based on catalog statistics of the relational database.

21. The computer system of claim 19, wherein P and R are further based on a pilot sample of rows from the relational database.

* * * * *